United States Patent
Buehler et al.

(10) Patent No.: US 10,381,168 B2
(45) Date of Patent: Aug. 13, 2019

(54) HYBRID SUPERCAPACITOR

(71) Applicant: Robert Bosch GmbH, Stuttgart (DE)

(72) Inventors: Elisabeth Buehler, Tamm (DE); Frederik Golks, Tuebingen (DE); Mathias Widmaier, Magstadt (DE); Pallavi Verma, Leinfelden (DE); Thomas Wagner, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 223 days.

(21) Appl. No.: 15/273,851

(22) Filed: Sep. 23, 2016

(65) Prior Publication Data

US 2017/0229253 A1 Aug. 10, 2017

(30) Foreign Application Priority Data

Sep. 25, 2015 (DE) .................. 10 2015 218 433

(51) Int. Cl.
*H01G 11/60* (2013.01)
*H01G 11/30* (2013.01)
*H01G 11/50* (2013.01)
*H01G 11/62* (2013.01)
*H01G 11/06* (2013.01)
*H01G 11/34* (2013.01)
*H01G 11/36* (2013.01)
*H01G 11/64* (2013.01)

(52) U.S. Cl.
CPC ............. *H01G 11/60* (2013.01); *H01G 11/06* (2013.01); *H01G 11/30* (2013.01); *H01G 11/34* (2013.01); *H01G 11/36* (2013.01); *H01G 11/50* (2013.01); *H01G 11/62* (2013.01); *H01G 11/64* (2013.01); *Y02E 60/13* (2013.01); *Y02T 10/7022* (2013.01)

(58) Field of Classification Search
CPC ........ H01G 11/60; H01G 11/04; H01G 11/30; H01G 11/32; H01G 11/36; H01G 11/46; H01G 11/48; H01G 11/62; H01G 11/64
See application file for complete search history.

(56) References Cited

U.S. PATENT DOCUMENTS

| | | | | |
|---|---|---|---|---|
| 7,785,495 | B2* | 8/2010 | Kikuchi ............ | C08G 8/20 252/500 |
| 2010/0134954 | A1* | 6/2010 | Wright ............ | H01G 9/155 361/502 |
| 2010/0321863 | A1* | 12/2010 | Kurakane ......... | H01G 11/34 361/502 |
| 2011/0075323 | A1* | 3/2011 | Kawakami ........ | H01G 9/016 361/503 |

FOREIGN PATENT DOCUMENTS

| | | |
|---|---|---|
| DE | 694 30 842 T2 | 2/2003 |
| WO | 2013/110741 A1 | 8/2013 |
| WO | 2014/160385 A2 | 10/2014 |

OTHER PUBLICATIONS

Iwama, et al., Characterization of commercial supercapacitors for low temperature applications, Journal of Power Sources, Elsevier, 2012, vol. 219, pp. 235-239.
Borges, et al., Supercapacitor Operating at 200 Degrees Celsius, Scientific Reports. 3:2572, Sep. 3, 2013.
Low Temperature Supercapacitors, NASA Tech Brief, Jul. 2008, pp. 11-12.

* cited by examiner

*Primary Examiner* — C Melissa Koslow
(74) *Attorney, Agent, or Firm* — Walter Ottesen, P.A.

(57) ABSTRACT

A hybrid supercapacitor has two electrodes, one of which functions as a cathode, and the other as an anode. The hybrid supercapacitor further includes an electrolyte arranged between the cathode and the anode. The electrolyte contains a solvent selected from the group consisting of methanol, 1-propanol, 1-heptanol, ethyl acetoacetate, ethylene glycol, diethylene glycol, glycerol, benzyl alcohol, di-n-butyl phthalate and mixtures thereof.

6 Claims, 1 Drawing Sheet

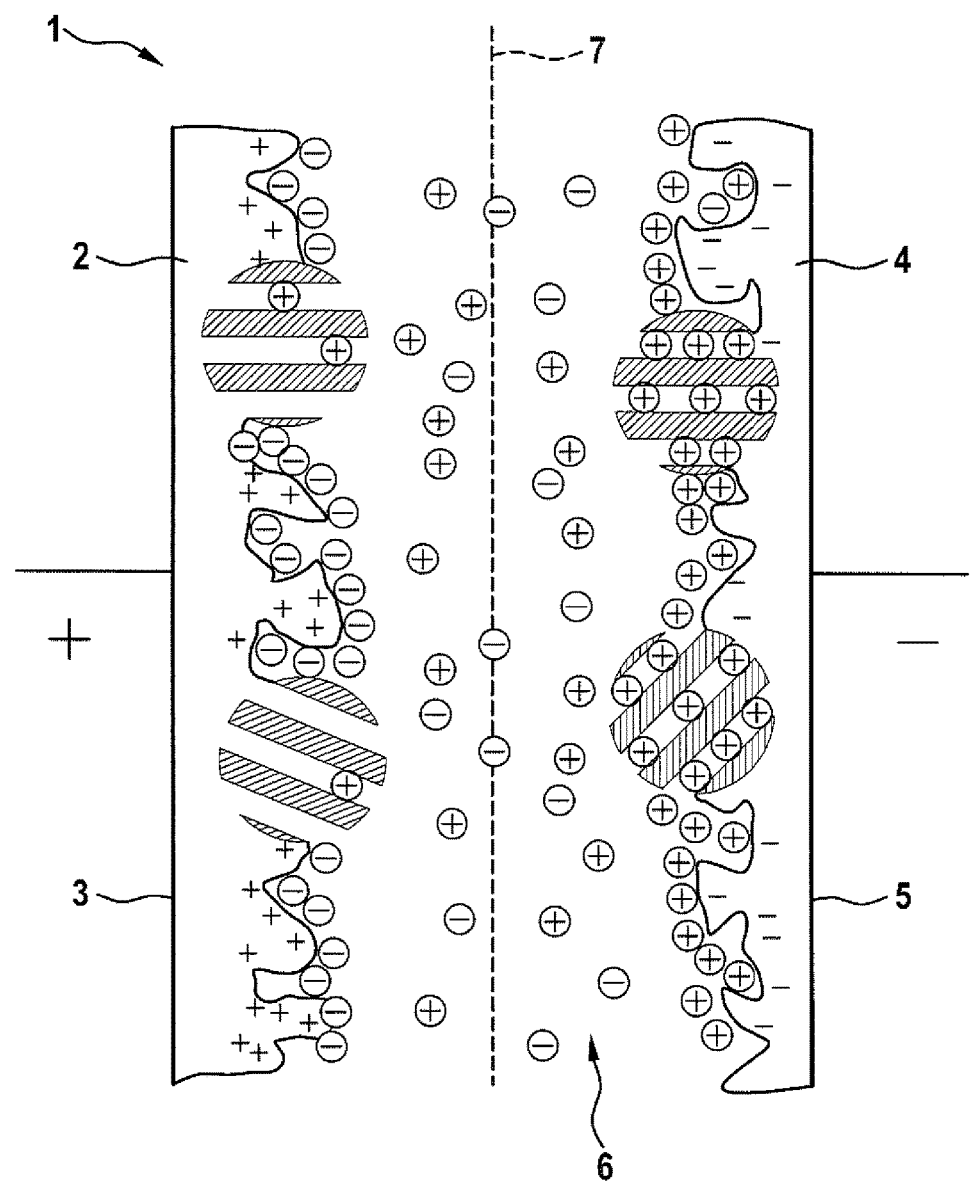

HYBRID SUPERCAPACITOR

This application claims priority under 35 U.S.C. § 119 to patent application number DE 10 2015 218 433.1, filed on 25 Sep. 2015 in Germany, the disclosure of which is incorporated herein by reference in its entirety.

BACKGROUND

The present disclosure relates to a hybrid supercapacitor characterized by the constituents of its electrolyte.

Hybrid supercapacitors (HSCs), for example lithium ion capacitors, are a new generation of supercapacitors which can provide more power than lithium ion batteries. Although lithium ion batteries have a high energy density of more than 100 Wh/kg, they are able to release this energy only slowly. Hybrid supercapacitors have a higher energy density than supercapacitors (EDLCs/SCs), which are able to provide a power release of more than 100 kW/kg but have only a low energy density. Hybrid supercapacitors can be charged, for example, by means of short high-energy pulses as occur in the braking energy recuperation of motor vehicles. The electrical energy recovered in this way can subsequently be used to accelerate the motor vehicle. This enables saving of fuel and the reduction of carbon dioxide emissions. Hybrid supercapacitors are also being considered for use as an energy source in power tools. Since hybrid supercapacitors are a new technology compared to conventional supercapacitors and lithium ion batteries, only a few products are commercially available to date. Usually, in fields of application that would be suitable for hybrid supercapacitors, oversized lithium ion batteries are used, which, because of their size, are capable of providing the power required for the application in question.

E. Iwama, P. L. Taberna, P. Azais, L. Brégeon, P. Simon, Journal of Power Sources, 2012, 219, 235 states that the electrolytes most commonly used in hybrid supercapacitors contain acetonitrile or propylene carbonate as solvent. The use of such hybrid supercapacitors is limited to temperatures of not more than 70° C. R. S. Borges, A. L. M. Reddy, M.-T. F. Rodrigues, H. Gullapalli, K. Balakrishnan, G. G. Silva, P. M. Ajayan, Nature 2013, 3, 2572 reports that the operating range of supercapacitors can be extended to up to 200° C. when electrolytes consisting of a mixture of an ionic liquid with clay are used. However, even higher temperatures are inaccessible for the operation of hybrid supercapacitors.

In addition, the operation of hybrid supercapacitors, in the case of use of acetonitrile and propylene carbonate as solvent of the electrolyte, is limited at the lower end to a temperature of −55° C. Low Temperature Supercapacitors, NASA Tech Briefs, July 2008, 11-12, describes the use of ethyl acetate and methyl formate as cosolvents of the electrolyte. Even through use of these cosolvents, however, it is only possible to lower the lower temperature limit down to −60° C.

SUMMARY

The hybrid supercapacitor of the disclosure has an electrolyte containing a solvent selected from the group consisting of methanol, 1-propanol, 1-heptanol, ethyl acetoacetate, ethylene glycol, diethylene glycol, glycerol, benzyl alcohol, di-n-butyl phthalate and mixtures thereof. These electrolytes enable use of the hybrid supercapacitor at low temperatures down to −100° C. and/or at high temperatures up to 240° C.

In one embodiment of the hybrid supercapacitor, the solvent is selected from the group consisting of methanol, 1-propanol, 1-heptanol, ethyl acetoacetate and mixtures thereof. These solvents are of particularly good suitability for use of the hybrid supercapacitor at low temperatures. However, they do not enable use thereof at very high temperatures.

In an alternative embodiment of the hybrid supercapacitor, the solvent is selected from the group consisting of ethylene glycol, diethylene glycol, glycerol, benzyl alcohol, di-n-butyl phthalate and mixtures thereof. These solvents are of particularly good suitability for use of the hybrid supercapacitor at high temperatures. However, they do not enable use of the hybrid supercapacitor at particularly low temperatures.

Preferably, tetraethylammonium tetrafluoroborate $((C_2H_5)_4NBF_4)$ and/or at least one lithium salt has been added to the solvent, and is dissolved therein. These conductive salts increase the polarity of the solution formed together with the solvent and thus enable it to work as electrolyte.

In order to achieve a particularly favorable interaction with typical electrode materials of a hybrid supercapacitor, it is preferable that the lithium salt is selected from the group consisting of lithium perchlorate ($LiClO_4$), lithium hexafluorophosphate ($LiPF_6$), lithium tetrafluoroborate ($LiBF_4$), lithium bistrifluoromethanesulfonimide (LiN$(SO_2CF_3)_2$, LiTFSi) lithium bispentafluoroethanesulfonimide (LiN$(SO_2C_2F_5)_2$), lithium bisfluorosulfonylimide (LiN$(SO_2F)_2$, LiFSi), lithium bisoxalatoborate (LiB$(C_2O_4)_2$, LiBOB), lithium oxalyldifluoroborate (LiBF$_2(C_2O_4)$, LiODFB), lithium tris(pentafluoroethane)-trifluorophosphate (LiPF$_3(CF_2CF_2)_3$, LiFAP), lithium trifluoromethanesulfonate (LiCF$_3SO_3$).

The tetraethylammonium tetrafluoroborate and/or the lithium salt preferably have a concentration in the solvent in the range from 0.1 mol/L to 2.0 mol/L. As a result, reliable electrolyte properties are firstly imparted to the solvent. Secondly, by virtue of an increase in the boiling point and lowering of the melting point of the solvent, the operating range of the hybrid supercapacitor can be increased still further.

It is further preferable that the electrolyte contains 0.1% by weight to 10.0% by weight of an additive other than the tetraethylammonium tetrafluoroborate and than the lithium salt dissolved in the solvent. This additive can be added in order to still further improve the electrolyte properties of the electrolyte and/or to still further widen the temperature range in which the hybrid supercapacitor can be operated.

In one embodiment, the additive is a lithium salt. It may be selected from the same group of lithium salts from which the aforementioned lithium salt has also been selected. It should be noted merely that it has to be different than the lithium salt already being used. This enables modification of the electrolyte properties through a combination of different salts.

In another embodiment, the additive is an organic solvent. This can be added in order to still further widen the temperature range in which the electrolyte is liquid. The organic solvent may, for example, be a solvent selected from the same list as the aforementioned solvent that makes up the main constituent of the electrolyte. However, it may also, for example, be ethyl acetate or methyl formate, with which the lowering of the melting point of the electrolyte described by R. S. Borges et al. can be achieved.

The hybrid supercapacitor has two electrodes, one of which functions as cathode and the other as anode. A first electrode preferably contains at least one material selected from a first group. This group consists of activated carbon, graphene, carbon nanotubes, carbon aerogels, carbon nanofibers, ruthenium oxide, manganese oxide, titanium oxide, polyaniline (PANI) and polypyrrole (Ppy). The second electrode preferably has at least one material selected from a second group. This group consists of $Co_3O_4$, $V_2O_5$, $TiO_2$, $Li_4Ti_5O_{12}$, $Li_3V_2(PO_4)_3$, $LiMoO_2$, $LiMn_2O_4$, $LiNiMnCoO_2$ and $LiMn_xFe_{1-x}PO_4$ where x is in the range from 0 to 0.9. When x=0, the second group also includes $LiFePO_4$.

When the first electrode consists solely of materials from the first group, the hybrid supercapacitor is an asymmetric hybrid supercapacitor. When a carbon-based material is chosen as material for the first electrode, this forms an EDLC (electrochemical double layer charging) electrode. If, instead, one of the metal oxides or the polymers is chosen as electrode material, the first electrode forms a pseudocapacitance. The first electrode can be used either as cathode or as anode in an asymmetric hybrid supercapacitor.

Preferably, the hybrid supercapacitor, however, is a symmetric hybrid supercapacitor, which is also referred to as parallel hybrid supercapacitor. In the latter, the first electrode further comprises at least one material selected from the second group and the second electrode further comprises at least one material selected from the first group. As a result, it is possible for faradaic reactions to proceed in both electrodes.

BRIEF DESCRIPTION OF THE DRAWINGS

Working examples of the disclosure are illustrated by the drawing and elucidated in detail in the description which follows.

The FIGURE shows, in schematic form, the construction of a hybrid supercapacitor according to various working examples of the disclosure.

DETAILED DESCRIPTION

In all the working examples of the hybrid super-capacitor 1 described hereinafter, it has the construction shown in the FIGURE. It has a cathode 2 containing $LiMn_2O_4$ in a matrix composed of activated carbon. The cathode 2 has been applied to a first collector 3. In addition, the hybrid supercapacitor 1 has an anode 4 consisting of $Li_4Ti_5O_{12}$ in a matrix composed of activated carbon. The anode 4 has been applied to a second collector 5. Arranged between the cathode 2 and the anode 4 is an electrolyte 6. A porous separator 7 separates the two electrodes 2, 4 from one another. Embedding of $Li^+$ ions into the cathode 2 and into the anode 4 is shown in schematic form in the FIGURE in four enlargements.

The electrolyte 6, in different working examples of the disclosure, contains different solvents in each case as main constituent. 1.0 mol/L lithium perchlorate is dissolved in each solvent. As additives, the electrolyte 6 in all working examples contains 3.0% by weight of lithium bistrifluoromethanesulfonimide. In working examples B5 to B9, it additionally contains 5.0% by weight of ethyl acetate.

In working examples B1 to B4, the solvent in each case is one of the solvents listed in table 1:

TABLE 1

| # | Solvent | | BP [° C.] | MP [° C.] | ρ [g/mL] | P |
|---|---|---|---|---|---|---|
| B1 | methanol | $CH_4O$ | 64.6 | −98.0 | 0.791 | 0.762 |
| B2 | 1-propanol | $C_3H_8O$ | 97.0 | −126.0 | 0.803 | 0.617 |

TABLE 1-continued

| # | Solvent | | BP [° C.] | MP [° C.] | ρ [g/mL] | P |
|---|---|---|---|---|---|---|
| B3 | 1-heptanol | $C_7H_{16}O_2$ | 176.4 | −35.0 | 0.819 | 0.549 |
| B4 | ethyl acetoacetate | $C_6H_{10}O_3$ | 180.4 | −80.0 | 1.028 | 0.577 |

In this table, BP denotes the boiling temperature, MP the melting temperature, ρ the density and P the relative polarity.

Hybrid supercapacitors 1 according to working examples B1 to B4 can be used at operating temperatures down to −100° C., since the salts dissolved in the solvents and the ethyl acetate still further lower the melting temperatures of the solvents, which were already low in any case.

According to working examples B5 to B9, one of the solvents mentioned in table 2 is used.

TABLE 2

| # | Solvent | | BP [° C.] | MP [° C.] | ρ [g/mL] | P |
|---|---|---|---|---|---|---|
| B5 | ethylene glycol | $C_2H_8O_3$ | 197.0 | −13.0 | 1.115 | 0.790 |
| B6 | glycerol | $C_3H_8O_3$ | 290.0 | 17.8 | 1.261 | 0.812 |
| B7 | diethylene glycol | $C_4H_{10}O_3$ | 245.0 | −10.0 | 1.118 | 0.713 |
| B8 | benzyl alcohol | $C_7H_8O$ | 205.4 | −15.3 | 1.042 | 0.608 |
| B9 | di-n-butyl phthalate | $C_{16}H_{10}O_3$ | 340.0 | −35.0 | 1.049 | 0.272 |

The high boiling points of these solvents, which are increased even further by the salts added, enable use of the hybrid supercapacitor 1 at temperatures up to 240° C. In examples B5 and B9, it is possible to achieve even higher operating temperatures.

What is claimed is:

1. A hybrid supercapacitor, comprising:
an electrolyte including a solvent,
wherein the solvent is at least one of ethylene glycol, diethylene glycol, glycerol, benzyl alcohol, and di-n-butyl phthalate.

2. A hybrid supercapacitor, comprising:
an electrolyte including a solvent,
wherein the solvent is at least one of ethylene glycol, diethylene glycol, glycerol, benzyl alcohol, and di-n-butyl phthalate,
wherein the electrolyte comprises tetraethylammonium tetrafluoroborate and/or at least one lithium salt dissolved in the solvent, and
wherein the electrolyte contains 0.1% by weight to 10.0% by weight of an additive other than the tetraethylammonium tetrafluoroborate and the at least one lithium salt.

3. The hybrid supercapacitor according to claim 2, wherein the at least one lithium salt is at least one of lithium perchlorate, lithium hexafluorophosphate, lithium tetrafluoroborate, lithium bistrifluoromethanesulfonimide, lithium bispentafluoroethanesulfonimide, lithium bisfluorosulfonylimide, lithium bisoxalatoborate, lithium oxalyldifluoroborate, lithium tris(pentafluoroethane)-trifluorophosphate, and lithium trifluoromethanesulfonate.

4. The hybrid supercapacitor according to claim 2, wherein tetraethylammonium tetrafluoroborate and the at least one lithium salt have a concentration in the solvent in a range of approximately 0.1 mol/L and approximately 2.0 mol/L.

5. The hybrid supercapacitor according to claim 2, wherein the additive is a lithium salt.

6. A hybrid supercapacitor, comprising:
an electrolyte including a solvent,
a first electrode containing at least one material selected from a first group consisting of activated carbon, graphene, carbon nanotubes, carbon aerogels, carbon nanofibers, ruthenium oxide, manganese oxide, titanium oxide, polyaniline, and polypyrrole, and
a second electrode containing at least one material selected from a second group consisting of $Co_3O_4$, $V_2O_5$, $TiO_2$, $Li_4Ti_5O_{12}$, $Li_3V_2(PO_4)_3$, $LiMoO_2$, $LiMn_2O_4$, $LiNiMnCoO_2$, and $LiMn_xFe_{1-x}PO_4$,
wherein x is in a range from 0 to 1,
wherein the solvent is at least one of methanol, 1-propanol, 1-heptanol, ethyl acetoacetate, ethylene glycol, diethylene glycol, glycerol, benzyl alcohol, and di-n-butyl phthalate, and
wherein:
the first electrode further comprises at least one material selected from the second group, and
the second electrode further comprises at least one material selected from the first group.

* * * * *